No. 797,915. PATENTED AUG. 22, 1905.
W. T. RUSHTON.
FURNACE FOR ROASTING ORES.
APPLICATION FILED DEC. 16, 1903.

No. 797,915. PATENTED AUG. 22, 1905.
W. T. RUSHTON.
FURNACE FOR ROASTING ORES.
APPLICATION FILED DEC. 16, 1903.

UNITED STATES PATENT OFFICE.

WILLIAM THOMAS RUSHTON, OF LONDON, ENGLAND.

FURNACE FOR ROASTING ORES.

No. 797,915.　　　Specification of Letters Patent.　　　Patented Aug. 22, 1905.

Application filed December 16, 1903. Serial No. 185,394.

*To all whom it may concern:*

Be it known that I, WILLIAM THOMAS RUSHTON, a subject of the King of England, residing at London, England, have invented certain new and useful Improvements in or Relating to Furnaces for the Roasting of Ores, of which the following is a specification.

This invention relates to furnaces for the roasting of ores, and has for its object to construct an apparatus which may be continuously in operation, an intermittent charging taking place at one point and a corresponding discharging being effected at another.

According to this invention the furnace comprises one or more rotating cylindrical muffles having internal spiral flanges whereby the material under treatment is conveyed from end to end of the cylinder as the latter rotates. Cross projections or inclined baffles are preferably arranged between adjacent flanges projecting laterally therefrom, so as to assist in moving the material. The cylinder is provided with fixed ends through which the material to be treated is conveyed in and out, openings being also provided for the admission of air and steam and for the exit of gases and vapors. Conveniently two such cylinders are disposed one above or near the other in such a way that the material after being fed into one end of one cylinder passes out at the other end, whence it is led into the second cylinder, from which it is ultimately conveyed away. The feeding into and from each cylinder is effected conveniently intermittently by means of suitable valves controlled by cams on the ends of the cylinder or otherwise, as found desirable. Preferably the initial feed takes place through an intermediate chamber or hopper, which serves as a trap and also as a means for measuring the quantity of material delivered, so that this may be effected at a uniform rate. The discharge from the first cylinder is preferably continuous, the material passing into the hopper, the delivery from which is intermittently opened to allow the contents to enter the second cylinder. The discharge from the second cylinder takes place in a similar manner, the material being dumped in trucks or deposited in a conveyer or otherwise disposed of, as found desirable.

The cylinders may be constructed in various ways; but conveniently they are formed in sections supported on broad bearing-wheels mounted on shafts disposed beneath the cylinder and carried in bearings in the furnace-walls. By thus forming each cylinder in sections any part which is particularly subjected to wear and tear, as to the action of acids or otherwise, can be readily renewed without necessitating the renewal of the whole cylinder. To prevent overheating of the supporting-bars, they may be mounted in non-conducting bearings and inclosed or jacketed with non-conducting material.

Movement is imparted to each cylinder by suitable gearing. Conveniently rotary movement is imparted by pinions engaging with annular toothed wheels mounted on the end of each cylinder. Each annular pinion is flanged inwardly and mounted on the end of the cylinder, so as to form an annular recess in which rests the periphery of the disk closing the end of the cylinder.

The disk is preferably formed of two metal plates secured together and inclosing a layer of asbestos which projects around the periphery of the plate and forms a sufficiently tight joint. These end plates do not rotate, but are rigidly carried on bracket-arms or cross-pieces which are in turn mounted on the furnace-walls. Cams for operating the charging and discharging hopper valve are preferably mounted on the flanges of the annular pinions.

The heating apparatus below the rotating cylinder comprises burners of suitable type which are supplied with gas and air from convenient sources and are arranged immediately below the cylinders. Adjacent to these burners and in the burner-chamber are cylindrical or other compartments into which air is introduced for the purpose of being heated before it is conveyed to the interior of the cylinders. These air-heating chambers may be disposed close to the burners and preferably on either side thereof.

In the accompanying drawings.

Like letters indicate like parts throughout the drawings.

Referring to Figs. 1 to 4, on a base A rests the outside casing of the furnace comprising an arched fire-brick chamber A'. The ends of this chamber are closed by cast-iron plates $A^2$, which fit into grooves in the brickwork A'. Supported in bearings in these ends $A^2$ are two rotatable cylinders B and C, one above the other. Each cylinder is formed in sections, which are connected by faucet and spigot joints B' and C'. The cylinders B C consist of iron castings provided with internal projecting spiral flanges $B^2$ $C^2$, whereby the material under treatment is conveyed from end to end of the cylinder as the latter rotates, these flanges preferably tapering and being of such a depth and so spaced apart as to enable the requisite amount of material to be coped with and moved at the desired rate. Cross projections or baffles $B^3$ $C^3$ are arranged between adjacent flanges, projecting laterally therefrom and inclined downwardly on the upward-moving side of the cylinder. The object of these projections is to keep the ore constantly changing its position, and by inclining them as described the ore, which is carried some distance up the side of the cylinder during its rotation, rolls down in a constant stream and is turned over as it rolls. Each section of the cylinder is separately supported on broad bearing-wheels D', mounted on a shaft D, disposed beneath the cylinder and carried at its ends in bearings in the furnace-walls $A^2$. The cylinders are rotated by a worm E and worm-wheel F through pinions G, engaging with annular toothed wheels H, mounted on the end of each cylinder. These annular pinions H are provided with inwardly-projecting flanges H' and mounted on the ends of the cylinders, so as to form at the end of each cylinder an annular recess in which rests the periphery of a fixed disk J, closing the end of the cylinder. The disk J is preferably formed of two metal plates secured together and inclosing a layer of asbestos, which projects around the periphery of the disk and forms a sufficiently-tight joint. These end plates J do not rotate, but are rigidly carried on bracket-arms or cross-pieces K, mounted on the furnace-walls $A^2$. In these end plates J are formed the necessary openings through which the material is fed into and delivered from the cylinders. The plate J at one end of the cylinder B is provided with an inlet J' for air and a second inlet $J^2$ for steam. The plate at the opposite end has an outlet $J^3$ for the gaseous products evolved by the process of roasting. The apparatus for feeding the material to be treated comprises a chamber L, which discharges into an intermediate hopper M, which serves as a trap and as a means for measuring the quantity of material delivered, so that this may be effected at a uniform rate. This hopper has one valve M' at its inlet and a second valve $M^2$ at its outlet which discharges into the cylinder B. Both valves are operated by a pivoted lever N, controlled by a spring N' and actuated by a cam O on the rotating end of the cylinder. Normally the valve M' is opened and the hopper M is filled; but when the cam O comes in contact with the valve-lever the valve M' is closed, the valve $M^2$ is opened, and the contents of the hopper M are discharged into the cylinder B. When the cam O leaves the valve-lever, the valve $M^2$ is closed again and the valve M' opened.

Figure 1:
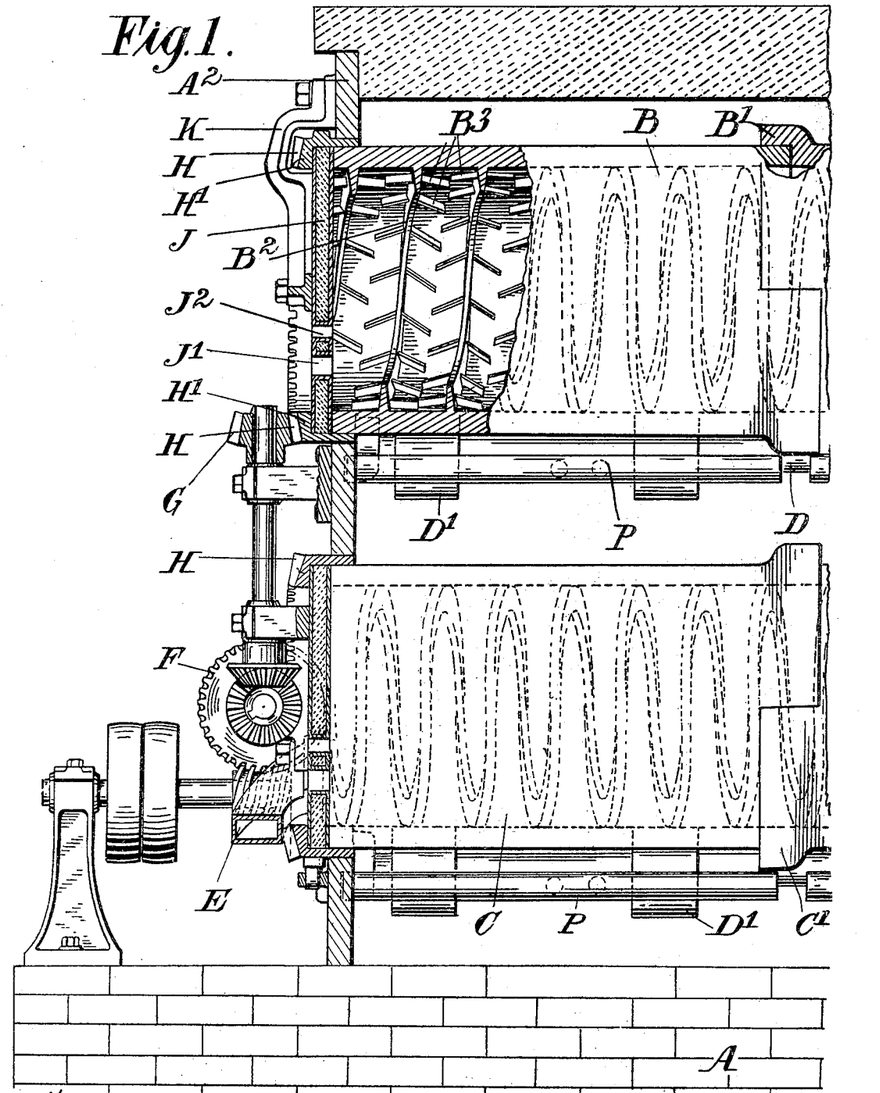
Figure 1 is a longitudinal central section, partly in elevation, of one form of furnace constructed in accordance with this invention.
Figure 2:
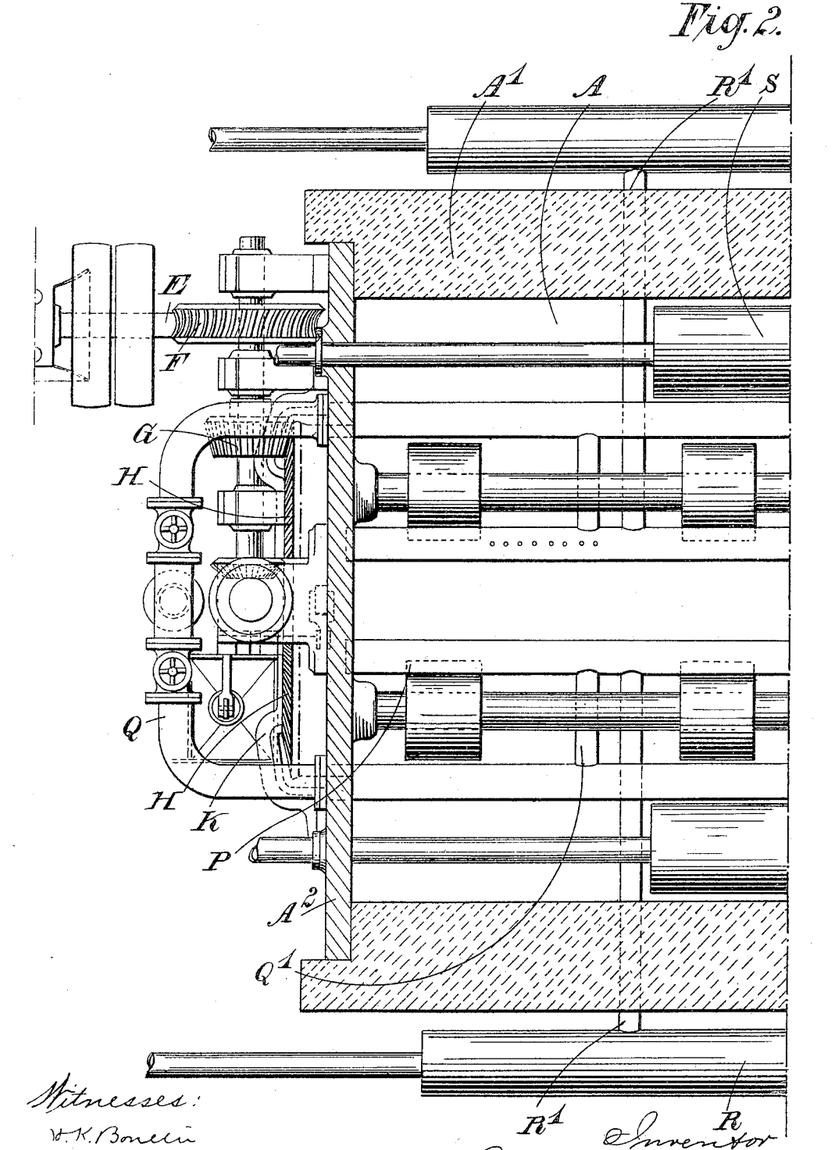
Fig. 2 is a horizontal section on the line 2 2 of Figs. 3 and 4.
Figure 3:
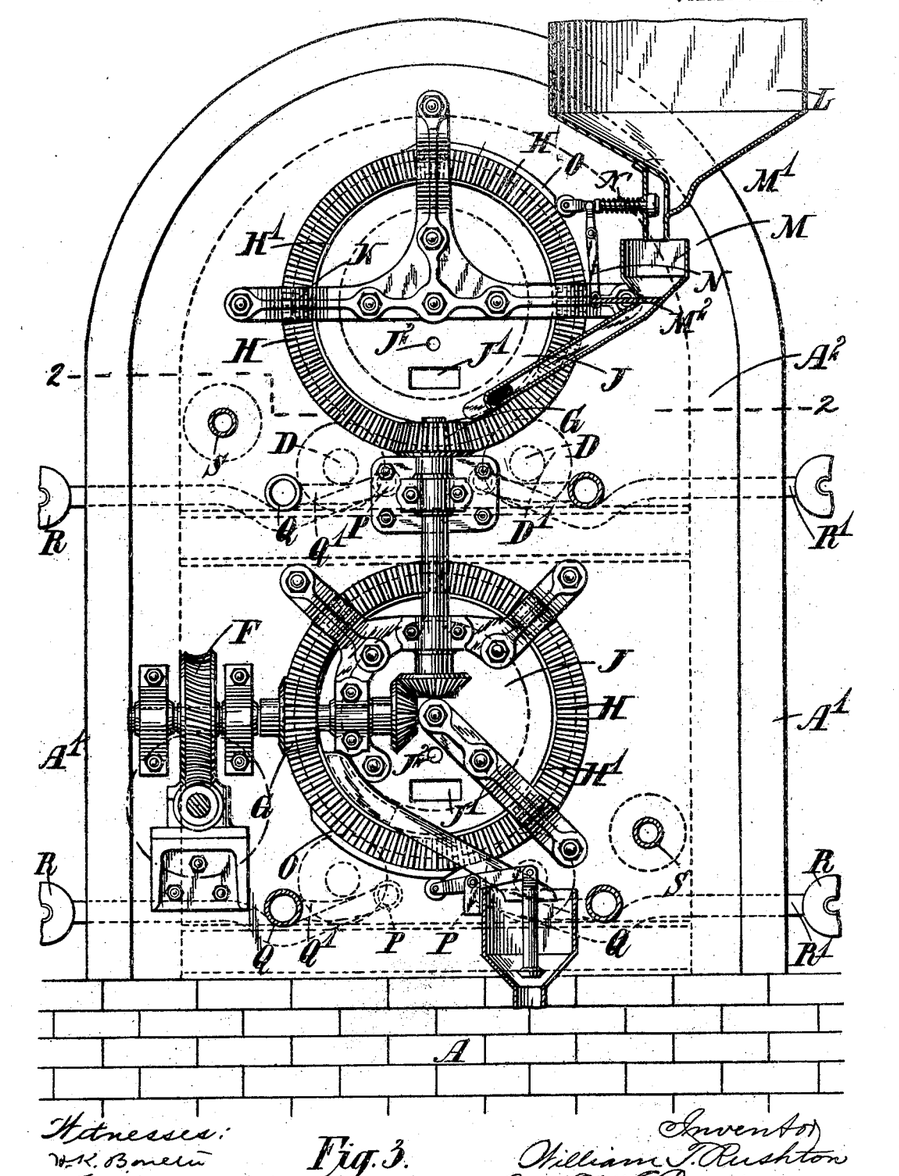
Fig. 3 is a front elevation of the furnace.
Figure 4:
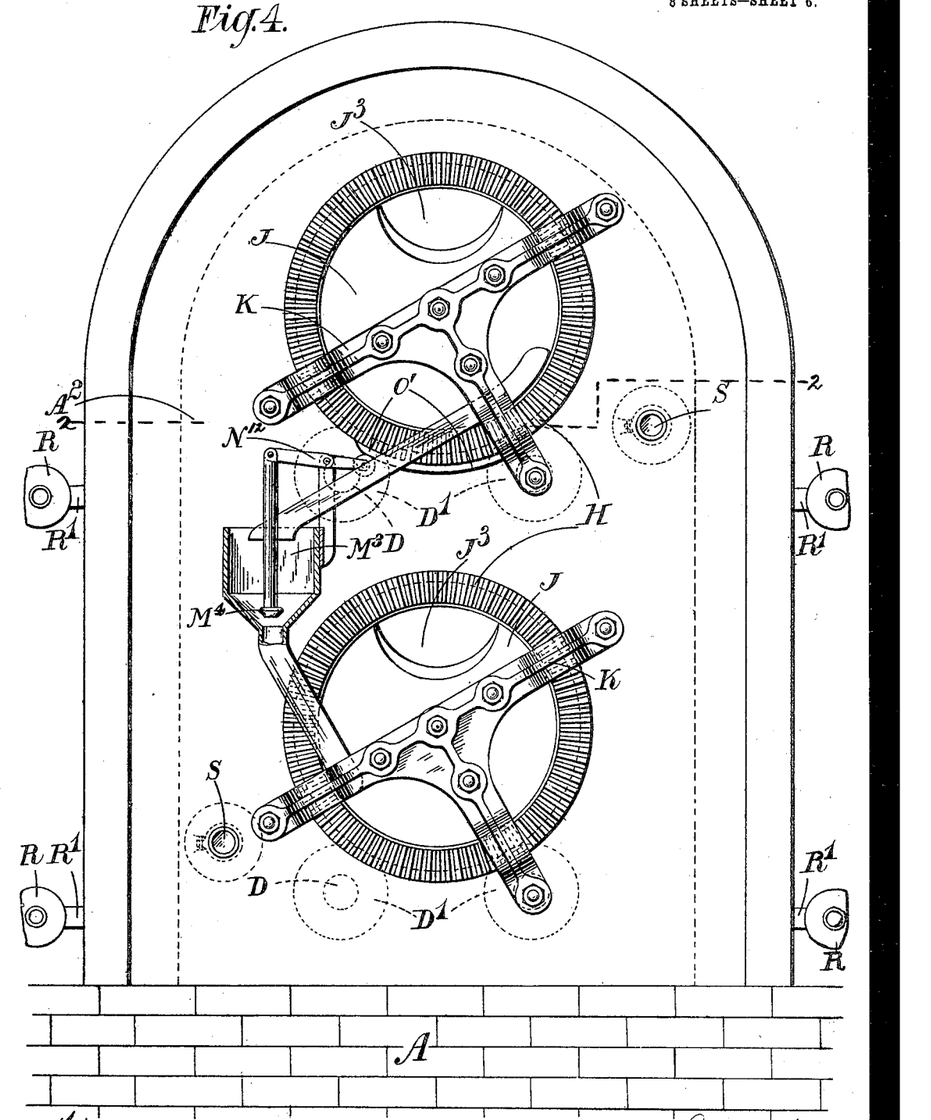
Fig. 4 is a back elevation of the same.

Referring to Fig. 4, the discharge from the first cylinder B is preferably continuous, the material passing into the hopper $M^3$, the discharge-valve $M^4$ of which is intermittently opened by the action of the cam O' on the lever $N^{12}$, so as to allow the contents to enter the second cylinder. The discharge from the second cylinder C takes place in a similar manner, the material being dumped in trucks or deposited in a conveyer or otherwise disposed of, as found desirable. The heating apparatus below the rotating cylinders comprises burners P, which are supplied with gas through pipes Q' from the gas-mains Q and with air through pipes R' from air-mains R. Adjacent to these burners P and in the burner-chamber are cylindrical compartments S, into which air is introduced for the purpose of being heated before it is conveyed to the cylinder air-inlets J'. These air-heating chambers S are disposed close to the burners P and on either side thereof.

Figure 5:
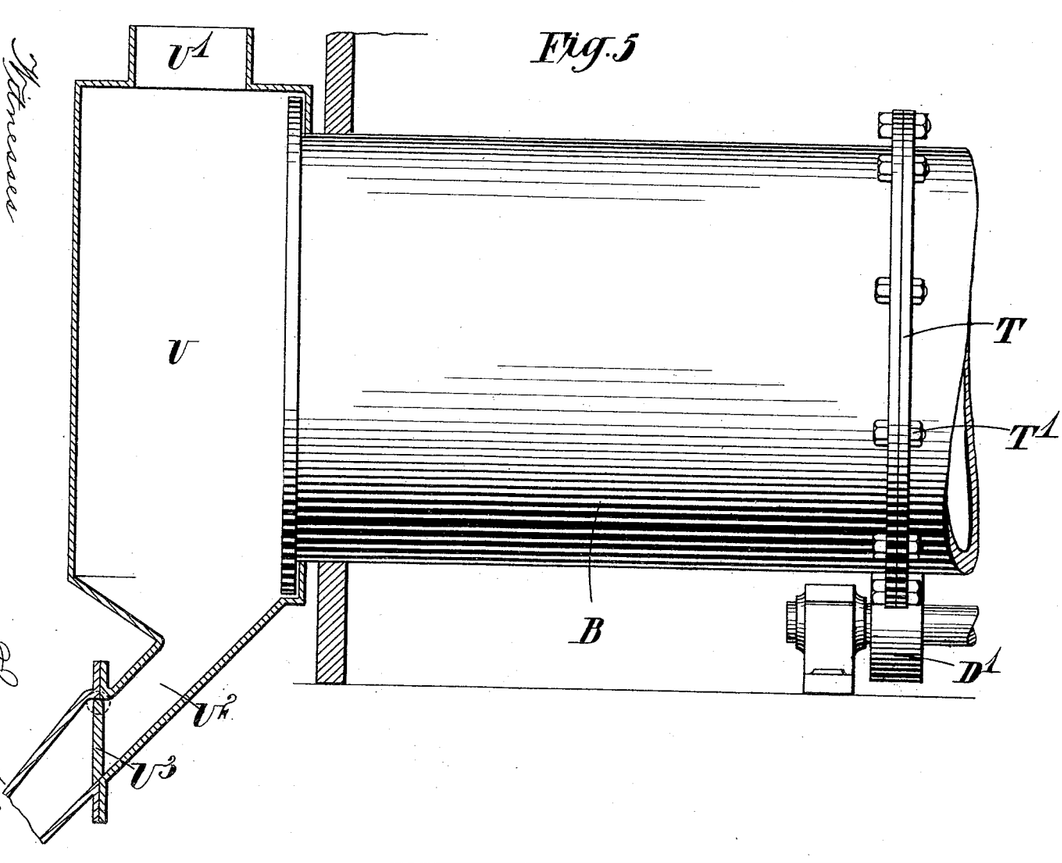
Fig. 5 is a longitudinal section of a modified form of furnace constructed in accordance with this invention.
Figure 6:
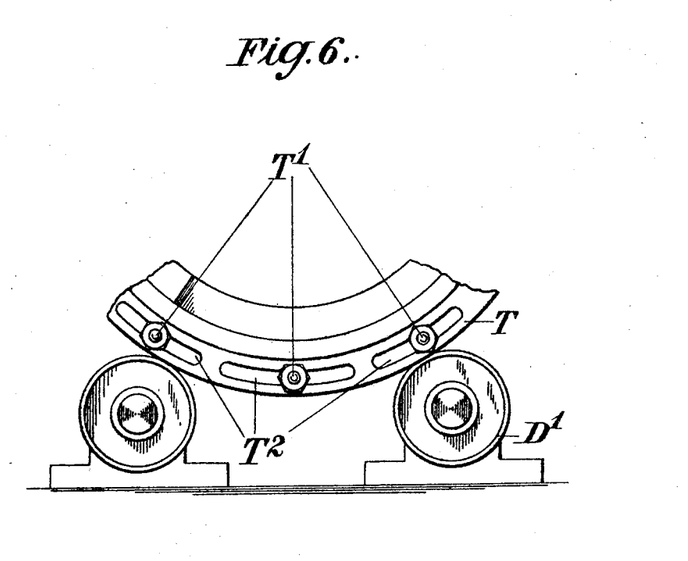
Fig. 6 is a side elevation of a portion of the same.

Referring to Figs. 5 and 6, which illustrate some modifications of the furnace constructions, the cylinder-sections may conveniently be connected by means of flanges T, secured together by bolts T'. In order to allow of adjustment of the adjacent sections to insure exact continuity of the spiral flanges, the flanges may be provided with slots $T^2$ for the bolts T', so that the sections may be slightly turned in relation to one another before the flanges are bolted together and secured by lock-nuts. When flanges are used, the supporting-wheels D' may bear against the flanges, as shown. In place of the intermittent discharging device described above the rotating cylinder may discharge into a fixed bonnet U, arranged at the end of the cylinder and provided with an outlet-flue U'. This bonnet is tapered at the bottom into a discharge-outlet $U^2$, in which is suspended a flap-valve $U^3$, which opens outward to allow of the discharge, but will not open inward to allow a back draft of air.

This invention has been described as applied to a furnace having two cylinders in series; but it is to be understood that it is equally applicable to a furnace provided with any number of cylinders in series or in parallel.

The whole apparatus as above described enables the treatment of the materials to be carried out continuously, the feed and discharge being regulated in accordance with the requirements of the material under treatment. The feed and discharge are effected conveniently by gravity, the arrangement being such as above described, so that the material can enter and leave the cylinders without cold air being allowed to have access to the interior, while the fumes therefrom are allowed to escape freely.

What I claim as my invention, and desire to secure by Letters Patent, is—

1. In a continuous roasting-furnace, the combination of a refractory furnace-chamber, a rotatable cylindrical muffle mounted therein having an internal spiral conveying-flange and baffles projecting laterally from each side of the flange and inclined downwardly on the upwardly-moving side.

2. In a continuous roasting-furnace, the combination of a refractory furnace-chamber, a rotatable cylindrical muffle mounted therein having an internal spiral conveying-flange, inclined baffles projecting laterally therefrom, an inwardly-directed flange fixed on each end of the cylinder forming an annular recess, stationary disks closing the cylinder ends and resting in these annular recesses and means for rotating the cylinders.

3. In a continuous roasting-furnace, the combination of a refractory furnace-chamber, a rotatable cylindrical muffle mounted therein having an internal spiral conveying-flange, inclined baffles projecting laterally therefrom, an inwardly-directed flange fixed on each end of the cylinder forming an annular recess, stationary disks closing the cylinder ends and resting in these annular recesses and comprising two metal plates secured together, a layer of asbestos inclosed between the plates, openings for charging and discharging and for inlet and outlet of air and other gases, bracket-arms mounted on the furnace-chamber and fixed to the disks and means for rotating the cylinders.

4. In a continuous roasting-furnace, the combination of a refractory furnace-chamber, a rotatable cylindrical muffle mounted therein having an internal spiral conveying-flange, inclined baffles projecting laterally therefrom, an inwardly-directed flange fixed on each end of the cylinder forming an annular recess, stationary disks closing the cylinder ends and resting in these annular recesses, an annular toothed wheel on each flange and means for rotating the wheels.

5. In a continuous roasting-furnace, the combination of a refractory furnace-chamber, two rotatable cylindrical muffles mounted therein in series one above the other and each having an internal spiral conveying-flange throughout, inclined baffles projecting laterally therefrom, means for rotating the cylinders, an inwardly-directed flange fixed on each end of each cylinder forming an annular recess, stationary disks closing the cylinder ends having openings for charging and discharging and for inlet and outlet of air and other gases, bearing-shafts under the cylinders and a series of bearing-wheels on the shafts disposed beneath the cylinders.

6. In a continuous roasting-furnace, the combination of a refractory furnace-chamber, two rotatable cylindrical muffles mounted therein in series one above the other, each having an internal spiral conveying-flange throughout, inclined baffles projecting laterally therefrom, means for rotating the cylinders, an inwardly-directed flange fixed on each end of each cylinder forming an annular recess, stationary disks closing the cylinder ends and resting in these annular recesses, having openings for charging and discharging and for inlet and outlet of air and other gases, an annular toothed wheel on each flange, means for rotating the toothed wheel, bearing-shafts under the cylinders and a series of bearing-wheels on the shafts disposed beneath the cylinders.

7. In a continuous roasting-furnace, the combination of a refractory furnace-chamber, two rotatable cylindrical muffles mounted therein in series one above the other, each having an internal spiral conveying-flange, stationary disks closing the ends of the cylinders and having openings for charging and discharging and for inlet and outlet of air and other gases, means for rotating the cylinders, a feed-hopper disposed near the inlet to the upper cylinder, an intermediate chamber connected therewith and with the charging-inlet, a first valve between the hopper and the chamber, a second valve between the chamber and the charging-inlet, and means for intermittently and simultaneously opening the second valve and closing the first valve.

8. In a continuous roasting-furnace, the combination of a refractory furnace-chamber, two rotatable cylindrical muffles mounted therein in series one above the other, each having an internal spiral conveying-flange, stationary disks closing the ends of the cylinders and having openings for charging and discharging and for inlet and outlet of air and other gases, means for rotating the cylinders, a feed-hopper disposed near the inlet to the upper cylinder, an intermediate chamber connected therewith and with the charging-inlet, a first valve between the hopper and the chamber, a second valve between the chamber and the charging-inlet, a pivoted lever connected to the two valves, a cam on the inlet end of each cylinder arranged to operate the lever intermittently to open the second valve and close the first.

9. In a continuous roasting-furnace, the combination of a refractory furnace-chamber, two rotatable cylindrical muffles mounted therein in series one above the other, means for intermittently charging and discharging each cylinder, stationary disks closing the cylinder ends having openings for charging and discharging and for inlet and outlet of air and other gases, means for rotating the cylinders, a burner beneath each cylinder and air-heating chambers connected with the air-inlets to the cylinders and disposed close to the burners.

In testimony whereof I have signed my name to this specification in the presence of two subscribing witnesses.

WILLIAM THOMAS RUSHTON.

Witnesses:
 HARRY B. BRIDGES,
 CLAUDE S. R. MCKENZIE.